United States Patent
Wang et al.

(10) Patent No.: US 11,390,458 B2
(45) Date of Patent: Jul. 19, 2022

(54) POWER-SAVING CONTROL DEVICE FOR OPERATION OF ELECTRONIC GARBAGE CAN

(71) Applicants: Nine Stars Group (U.S.A.) Inc., Chino, CA (US); Fujian Nashida Electronic Incorporated Company, Fujian (CN)

(72) Inventors: Xin Wang, Fuzhou (CN); Jiangqun Chen, Fuzhou (CN); Zhou Lin, Fuzhou (CN)

(73) Assignees: Nine Stars Group (U.S.A.) Inc., Chino, CA (US); Fujian Nashida Electronic Incorporated Company, Fujian (CN)

( * ) Notice: Subject to any disclaimer, the term of this patent is extended or adjusted under 35 U.S.C. 154(b) by 237 days.

(21) Appl. No.: 16/644,491

(22) PCT Filed: Dec. 19, 2017

(86) PCT No.: PCT/CN2017/117137
§ 371 (c)(1),
(2) Date: Mar. 4, 2020

(87) PCT Pub. No.: WO2019/041659
PCT Pub. Date: Mar. 7, 2019

(65) Prior Publication Data
US 2021/0171281 A1  Jun. 10, 2021

(30) Foreign Application Priority Data

Sep. 4, 2017  (CN) .......................... 201710785342.2

(51) Int. Cl.
*B65F 1/16* (2006.01)
*H02P 7/03* (2016.01)
(Continued)

(52) U.S. Cl.
CPC .......... *B65F 1/1638* (2013.01); *G05B 19/042* (2013.01); *H02P 7/04* (2016.02); *H02P 7/285* (2013.01); *G05B 2219/25252* (2013.01)

(58) Field of Classification Search
CPC ........ G05B 19/042; G05B 2219/25252; H02P 7/04; H02P 7/285
(Continued)

(56) References Cited

U.S. PATENT DOCUMENTS 5,574,344 A * 11/1996 Matsuoka ................ H02P 7/04
388/819
9,787,241 B2 * 10/2017 Hirota ..................... H02P 27/08

\* cited by examiner

*Primary Examiner* — David Luo
(74) *Attorney, Agent, or Firm* — Raymond Y. Chan; David and Raymond Parent Firm

(57) ABSTRACT

A power-saving control device for operation of an electronic garbage can includes a rotation-blocked current setting register, a sampling resistor, an analog-digital converter, an analog-digital conversion result register, and a comparing unit, which are electrically connected in sequence. The comparing unit compares a current value obtained in real time with a reference current value in the rotation-blocked current setting register, and when the real-time current value is greater than the reference current value, the microcomputer control unit stops supplying power to a motor by controlling the motor positive and negative rotation driving circuit. The power-saving control device has greatly reduced power consumption during operation of an electronic garbage can and a prolonged service life of its battery.

10 Claims, 3 Drawing Sheets

(51) Int. Cl.
*G05B 19/042* (2006.01)
*H02P 7/285* (2016.01)

(58) Field of Classification Search
USPC ........................................ 318/3, 34
See application file for complete search history.

POWER-SAVING CONTROL DEVICE FOR OPERATION OF ELECTRONIC GARBAGE CAN

CROSS REFERENCE OF RELATED APPLICATION

This is a U.S. National Stage under 35 U.S.C. 371 of the International Application Number PCT/CN2017/117137, filed Dec. 19, 2017, which claims priority under 35 U.S.C. 119(a-d) to Chinese application number 201710785342.2, filed Sep. 4, 2017. The afore-mentioned patent applications are hereby incorporated by reference in their entireties.

BACKGROUND OF THE PRESENT INVENTION

Field of Invention

The present invention relates to a controlling technology for electronic household garbage container, and more particularly to a power-saving control device for operation of electronic garbage can.

Description of Related Arts

According to the conventional electronic garbage cans, there are two types of lid opening triggering circuit, wherein one is induction triggering (induction garbage can), while another is switch triggering (touch garbage can). Because most of the electronic garbage cans utilize battery for power supply, power consumption has particularly been a critical issue for electronic garbage cans. The power consumption of the electronic garbage can consists of two portions, wherein the first portion is the stand-by power consumption (when the lid is not moving), while the second portion is the action power consumption (when the lid is moving). The action of electronic garbage refers to the entire process for the motor to positively or negatively rotate to drive the lid to open or close. When the lid has opened or closed to the designated position and the lid has been in a position-restricted condition, if the motor is still powered, the motor is in a rotation-blocked condition. According to the conventional electronic garbage can, from the starting of action to the stopping of power to the motor, a controlling program is relied to assign a fixed rotation time to the motor, usually 1 second, for the duration of the action.

Nevertheless, a DC motor is used in the electronic garbage to drive its lid to move, wherein a characteristic of the DC motor is that it rotates faster with higher voltage mostly in a square relation. In fact, the battery capacity gradually decreases during the use of the electronic garbage can and the voltage of the battery gradually decreases as well. Basically, a full capacity 1.5V disposable battery runs out when its voltage has decreased to 1.0V. Hence, when the battery with sufficient capacity has higher voltage and, rotation of the motor is faster, such that only about 0.5 seconds is taken to open or close the lid. On the other hand, when he battery with low capacity has lower voltage, the rotation of the motor is slow that requires about 1 second to open or close the lid. Accordingly, it has to be designed to ensure the lid can be fully open and close even in low battery capacity (lower voltage), such that the fixed rotation time of the motor has to be designed as the 1 second for the lower voltage and slower motor rotation as required.

Unfortunately, when the battery capacity is relatively sufficient and the voltage thereof is higher, it actually takes only around 0.5 second to open or close the lid, which leaves the motor in a rotation-blocked condition for the other 0.5 second remaining approximately. For example, to a conventional 12 liters induction garbage can, when the battery capacity is sufficient (battery voltage is 1.5V), the current for the motor in moving the lid is about 70 mA and it takes 0.5 second for the lid to be fully opened, wherein because the lid has been opened to the designated position, the motor will be in the rotation-blocked condition for the remaining 0.5 second with a current of about 230 mA. Therefore, the actual electrical energy consumed for lid opening equals to 70 mA×0.5 s/3600=0.0097 mAh, while the energy wasted in the rotation-blocked condition is 230 mA×0.5 s/3600=0.0319 mAh. In other words, when the battery capacity is sufficient, energy wasted for the lid movement is about 3 times of the energy that is actually required therefor. In addition, although there is means for determining if the lid has been opened or closed to the designated position through photoelectric sensor or hall-sensor, it requires complex circuit and higher cost that hinders its widespread.

SUMMARY OF THE PRESENT INVENTION

An object of the present invention is to provide a power-saving control device for operation of electronic garbage can that has a simple structure in low cost and high reliability as well as a longer battery life with higher power efficiency, which overcomes drawbacks of the prior art.

According to the present invention, the foregoing and other objects and advantages are attained by a power-saving control device for operation of electronic garbage can, which comprises an opening signal triggering circuit, a motor positive and negative rotation driving circuit, and a microcomputer control unit, wherein the opening signal triggering circuit is connected with a controlling port of the motor positive and negative rotation driving circuit through the microcomputer control unit. The power-saving control device of the present invention further comprises a rotation-blocked current setting register and a sampling resistor which is connected with an analog-digital converter, an analog-digital conversion result register and a comparing unit sequentially, wherein the reference port of the comparing unit is connected with the rotation-blocked current setting register, wherein the output port of the comparing unit is connected with the microcomputer control unit.

An end of the sampling resistor is connected with the motor positive and negative rotation driving circuit, while the other end thereof is connected with a DC power supply, wherein the junction between the sampling resistor and the motor positive and negative rotation driving circuit is a sampling output port, wherein the sampling output port outputs a real-time current analog value, wherein the sampling output port is connected with the analog-digital converter so as to have the analog-digital converter converting the real-time current analog value into a real-time current digital value to be stored into the analog-digital conversion result register, wherein the rotation-blocked current setting register stores a predetermined reference current value, which is smaller than the actual rotation-blocked current value of the motor, wherein the comparing unit compares the real-time current value stored in the analog-digital conversion result register to the reference current value stored in the rotation-blocked current setting register, wherein when the real-time current value is greater than the reference current value, the comparing unit outputs a triggering command to the microcomputer control unit, rendering the microcomputer control unit control the motor positive and negative rotation driving circuit to stop power supplying to the motor.

When the motor is electrified, current that passes through the motor also passes through the sampling resistor, so the voltage between both ends of the sampling resistor can reflect the real-time current value of the motor. Therefore, to analog-digital convert that voltage into a digitalized real-time value helps to determine the volume of the current. When the value stored in the analog-digital conversion result register is smaller than the value stored in the rotation-blocked current setting register, the motor that drives the lid to move is remained electrified, and that when the value stored in the analog-digital conversion result register is larger than the value stored in the rotation-blocked current setting register, the power supply to the motor is stopped. Because when the motor is in the rotation-blocked condition, an impact peak valve of the current generated reaches the actual rotation-blocked current value instantly and exceeds the predetermined current value easily. Hence, the power to the motor can be stopped immediately once the rotation-blocked condition is occurred, so as to greatly reduce the power consumption for the movement of the electronic garbage can and extend the battery life span thereof. Besides, the present invention utilizes only a simple sampling and comparing controlling means to indirectly feedback the open/close conditions of the lid movement without the need of any stroke sensor while it is simple in structure, low in costs, and high in reliability.

In particular, the present invention further includes the following.

The analog-digital converter, the analog-digital conversion result register, the rotation-blocked current setting register, the comparing unit, and the microcomputer control unit are integrated in the same chip.

Alternatively, there may be an external analog-digital conversion chip connected with the microcomputer control unit, while the microcomputer control unit also performs the functions of the analog-digital conversion result register, the rotation-blocked current setting register, and the comparing unit.

In addition, the device also includes a RC filter, and the sampling output port is connected with the analog-digital converter through the RC filter.

Because the resistance of the sampling resistor is between 0.1-1Ω that the sampling resistor requires only a relatively small sampling value, the voltage drop rendered by the current of the motor passing through the sampling resistor is smaller, which causes less impact to the circuit efficiency of the motor. In order to obtain more stable sampling values, the voltages of both ends of the sampling resistor may be filtered by RC filter.

During the operation of the motor positive and negative rotation driving circuit, the microcomputer control unit controls the comparing unit to compare the real-time current value with the reference current value at every preset time.

The shortest time for the lid to open is an integral multiple of the preset time. For example, if it requires 500 ms for the lid to open when the battery capacity is full, then the above mentioned preset time can be 50 ms or 25 ms. In this manner, even if the rotation-blocked condition of the motor has occurred, the rotation-blocked duration will not exceed the above preset time, which greatly reduces the rotation-blocked duration and saves the power consumption for the movement of the electronic garbage can.

In view of above, the present invention provides a power-saving control device for operation of electronic garbage can, which utilizes a simple sampling and comparing controlling means to indirectly feedback the open/close conditions of the lid movement, so as to rapidly stop the power supply to the motor once the rotation-blocked condition occurs, which greatly reduces power consumption for the movement of the electronic garbage can and extends the battery life span thereof, while the device does not require any stroke sensor and is simple in structure, low in costs, and high in reliability.

Figure 1:
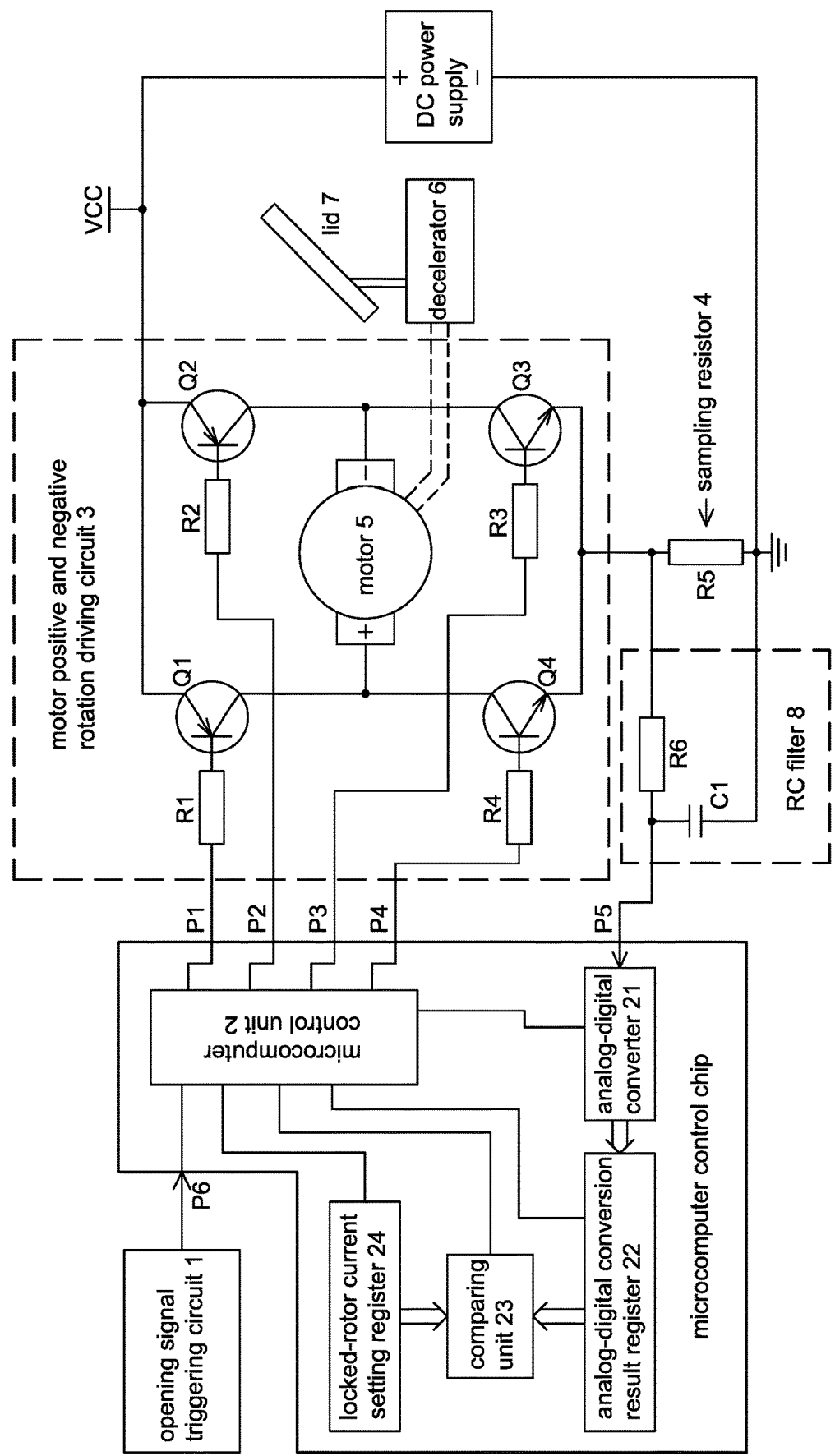
FIG. 1 is a circuit structure schematic diagram illustrating a power-saving control device for operation of electronic garbage can according to preferred embodiment of the present invention.

The reference numbers in the drawings are specified as follows:

1: opening signal triggering circuit, 2: microcomputer control unit, 21: analog-digital converter, 22: analog-digital conversion result register, 23: comparing unit, 24:

rotation-blocked current setting register, 3: motor positive and negative rotation driving circuit, 4: sampling resistor, 5: motor, 6: decelerator, 7: lid, 8: RC filter, P1-P6: ports of the microcomputer control unit, R1-R6: resistors, C1: capacitor, Q1-Q4: triodes.

DETAILED DESCRIPTION OF THE PREFERRED EMBODIMENT

Referring to FIG. 1, a power-saving control device for operation of electronic garbage can according to a preferred embodiment of the present invention comprises an opening signal triggering circuit 1, a motor positive and negative rotation driving circuit 3 (including a motor 5), a sampling resistor 4, an analog-digital converter 21, an analog-digital conversion result register 22, a rotation-blocked current setting register 24, a comparing unit 23, and a RC filter 8.

The opening signal triggering circuit 1 is configured to generate a lid opening signal at a P6 port and transmit to the microcomputer control unit 2 when a lid 7 of the electronic garbage can is needed to be opened. The motor 5, the triodes Q1-Q4, and the resistance R1-R4 forms the motor positive and negative rotation driving circuit 3. When the motor 5 is electrified, the motor 5 drives the decelerator 6 to rotate to drive the lid 7 to move. The sampling resistor 4 is formed by the resistor R5. The RC filter 8 is formed by the resistor R6 and the capacitor C1.

When the sampling resistor 4 and the motor positive and negative rotation driving circuit 3 are electrically connected in series, it is then electrically connected with the positive and negative electrodes of the DC power supply, wherein, specifically, an end of the sampling resistor 4 is electrically connected with the negative electrode of the DC power supply and the other end of the sampling resistor 4 is electrically connected with the motor positive and negative rotation driving circuit 3 at the joint of a sampling output port of the motor positive and negative rotation driving circuit 3, which is also electrically connected with an input port P5 of the analog-digital converter through the RC filter 8. When the motor 5 is electrified under the control of the motor positive and negative rotation driving circuit 3, the current that passes through the motor 5 also passes through the sampling resistor 4, so the voltage between both ends of the sampling resistor 4 can reflect the real-time current value of the motor 5. Therefore, to analog-digital convert that voltage into a digitalize value helps to determine the volume of the current.

The analog-digital converter 21 conducts analog-digital conversion for the voltage of the P5 port and stores the converted value into the analog-digital conversion result register 22. The comparing unit 23 compares the sampled value to the preset value stored in the rotation-blocked current setting register 24. If the value stored in the analog-digital conversion result register 22 is smaller than the value stored in the rotation-blocked current setting register 24, the motor 5 for driving the lid 7 to move is remained electrified. If the value stored in the analog-digital conversion result register 22 is larger than the value stored in the rotation-blocked current setting register 24, the microcomputer control unit 2 controls the motor positive and negative rotation driving circuit 3 to stop the power supply to the motor 5.

The value of the rotation-blocked current setting register 24 is preferred to be designed smaller than the actual rotation-blocked current, but larger than the current for the motor to move the lid. For instance, if the actual rotation-blocked current of the motor of a 12 liters induction garbage can is 230 mA and the current for the motor to move the lid is 70 mA, then the value of the rotation-blocked current setting register 24 can be preset to be 200 mA. To a microcomputer control unit without analog-digital conversion function, an analog-digital conversion chip may be additionally connected externally. According to the present embodiment, the analog-digital converter 21, the analog-digital conversion result register 22, the rotation-blocked current setting register 24, the comparing unit 23, and the microcomputer control unit 2 are all integrated in a microcomputer control chip, which circuit is more simple and reliable.

Accordingly, the sampling resistor 4 may be directly connected with the analog input port P5 of the microcomputer control unit 2. According to the present embodiment, the sampling resistor 4 is connected with the analog input port P5 of the microcomputer control unit 2 through the RC filter 8, so that the voltage of both ends of the sampling resistor 4 can be more stable through RC filtering. The other end of the motor positive and negative rotation driving circuit 3 is connected with a positive electrode of the power supply. The sampling resistance of the sampling resistor 4 is 0.5Ω. The rotation current of the motor 5 is 70 mA. The voltage drop between the two ends of the sampling resistor 4 equals to 0.07 A×0.5Ω=0.035V. When the rotation-blocked current of the motor 5 is 230 mA, the voltage drop between the two ends of the sampling resistor 4 equals to 0.23 A×0.5Ω=0.115V. If the DC power supply is 3V, the sampling resistor 4 does not affect the efficiency of the circuit of the motor much.

Figure 2:
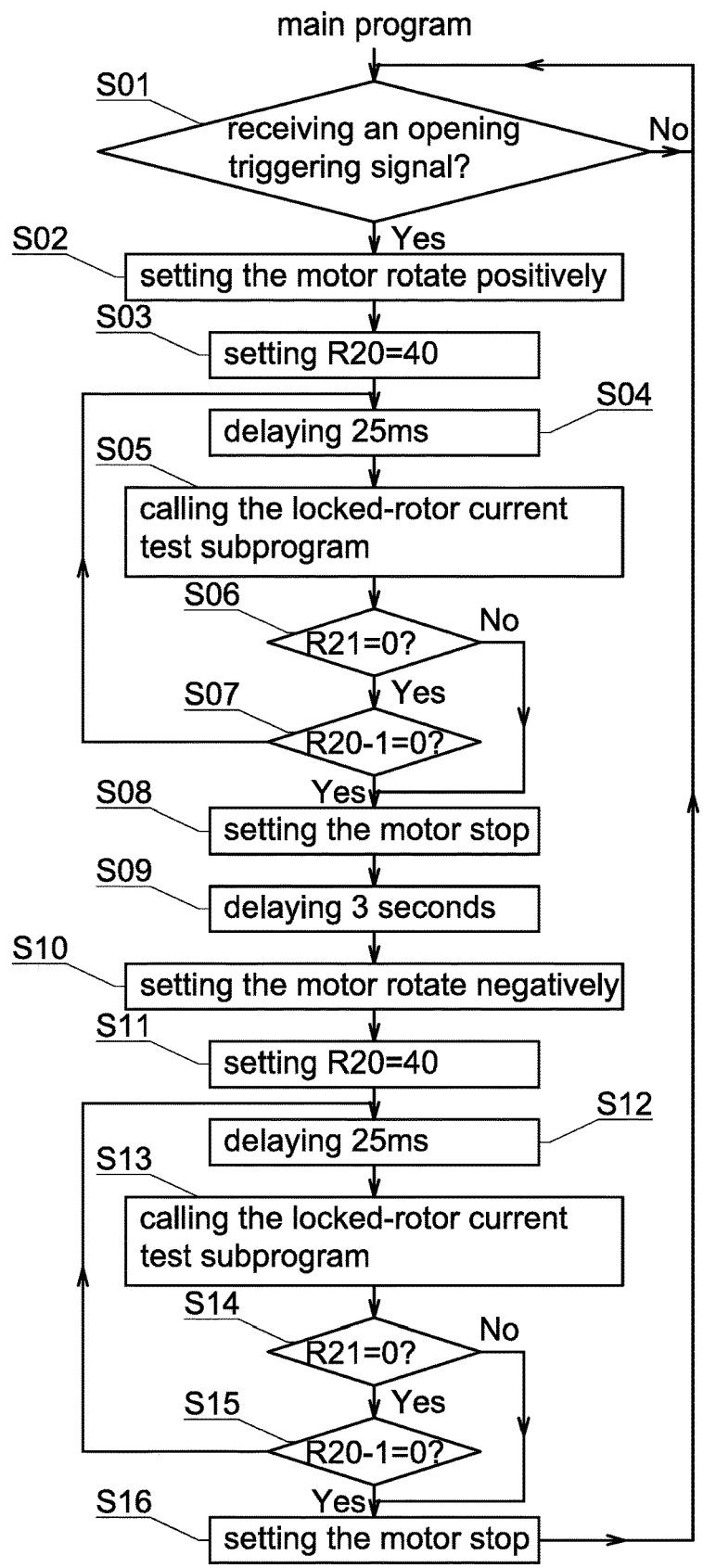
FIG. 2 is a work flow diagram illustrating the power-saving control device for operation of electronic garbage can according to the above preferred embodiment of the present invention.
Figure 3:
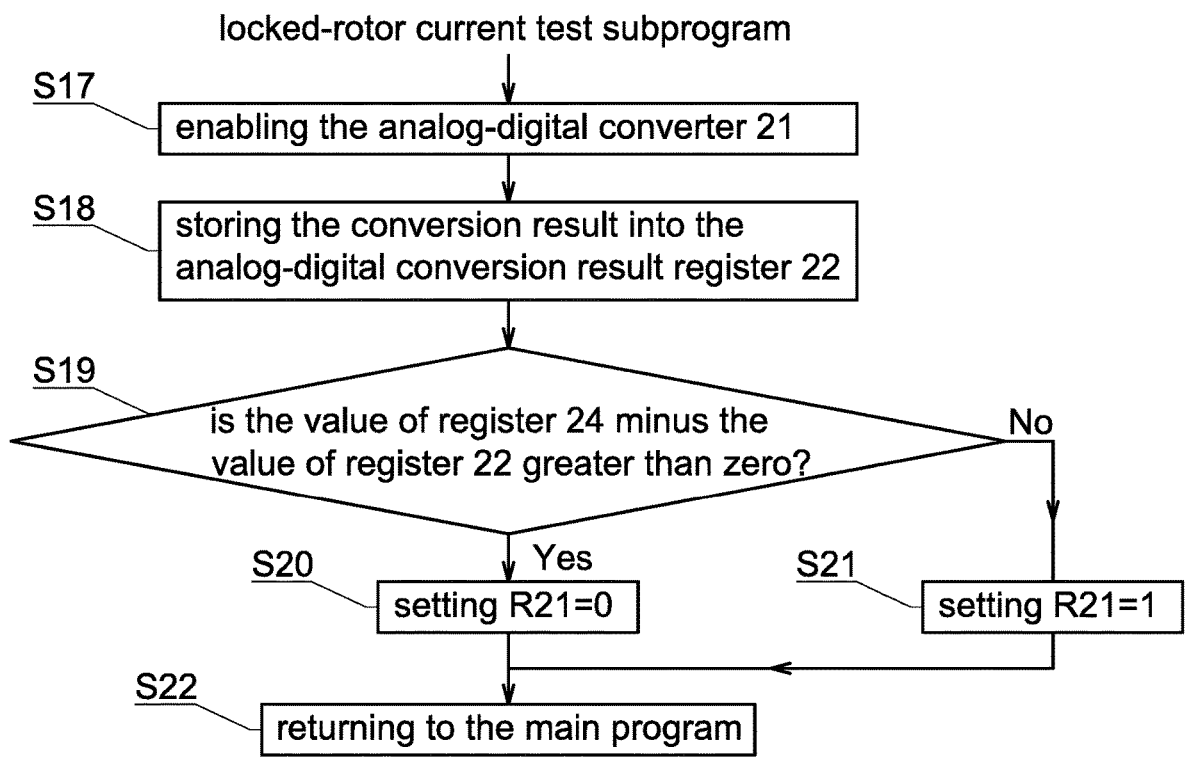
FIG. 3 is a flow diagram illustrating a rotation-blocked current test subprogram of the operation procedures of the power-saving control device for operation of electronic garbage can according to the above preferred embodiment of the present invention.

Referring to FIGS. 2 and 3, the operation procedures of the power-saving control device for operation of electronic garbage can of the present invention is specified as follows.

Step S01: Determine if the input port P6 of the microcomputer control chip has received an opening triggering signal, wherein execute the Step S01 if no opening triggering signal is received; execute the Step S02 if the opening triggering signal is received.

Step S02: Set the output port of the microcomputer control chip P1=P4=0 (low level), P2=P3=1 (high level), connect the triodes Q1 with Q3, disconnect the triodes Q2 with Q4, positively power the motor, start the lid opening, and execute the Step S03.

Step S03: Set the register R20=40 and execute the Step S04.

Step S04: Delay 25 ms and then execute the Step S05.

Step S05: Call the rotation-blocked current test subprogram and execute the Step S06 after returning.

Step S06: Determine if the value of the register R21 is zero, wherein if R21=0 (which indicates that the lid 7 has not opened and reached the designated position and the motor 5 does not have the rotation-blocked condition), execute the Step S07; if R21≠0 (which indicates that the lid 7 has opened and reached the designated position and the motor 5 does have the rotation-blocked condition occurred), execute the Step S08.

Step S07: Determine if the value of the register R20 minus 1 equals to zero, wherein if it is not zero (which indicates that the action time of lid opening has not been 1 second yet), return to execute the Step S04; if it is zero (which indicates that the action time of lid opening has passed 1 second), execute the Step S08.

Step S08: Set the output ports of the microcomputer control chip P1=P2=1 (high level), P3=P4=0 (low level), disconnect the triodes Q1, Q3, Q2, and Q4, stop supplying power for the motor to stop the motor, remain the lid in the opening condition, and execute the Step S09.

Step S09: Delay 3 seconds (the lid is remained in the opening condition for 3 seconds for garbage dumping and disposal) and execute the Step S10 afterwards.

Step S10: Set the output ports of the microcomputer control chip P1=P4=1 (high level), P2=P3=0 (low level), disconnect the triodes Q1 with Q3, connect the triodes Q2 with Q4, negatively power the motor, and execute the Step S11 after the lid has been closed.

Step S11: Execute the Step S12 after setting the register R20=40.

Step S12: Delay 25 ms and execute the Step S13.

Step S13: Call the rotation-blocked current test subprogram and execute the Step S14 after returning.

Step S14: Determine if the value of the register R21 is zero, wherein if R21=0 (which indicates that the lid 7 has not closed and reached the designated position and the motor 5 does not have the rotation-blocked condition), execute the Step S15; if R21≠0 (which indicates that the lid 7 has closed and reached the designated position and the motor 5 does have the rotation-blocked condition occurred), execute the Step S16.

Step S15: Determine if the value of the register R20 minus 1 equals to zero, wherein if it is not zero (which indicates that the action time of lid closing has not been 1 second yet), return to execute the Step S12; if it is zero (which indicates that the action time of lid closing has passed 1 second), execute the Step S16.

Step S16: Set the output ports of the microcomputer control chip P1=P2=1 (high level), P3=P4=0 (low level), disconnect the triodes Q1, Q3, Q2, and Q4, stop the motor from rotating, remain the lid in the close condition, and return to execute the Step S01 for the next use of the garbage can.

The rotation-blocked current test subprogram starts from the Step S17, wherein the steps of the subprogram include the following steps.

Step S17: Send a start signal by the microcomputer control unit 2 to the analog-digital converter 21, so that the analog-digital converter 21 conducts an analog-digital conversion for the current voltage of the analog port P5, and then execute the Step S18 after the analog-digital conversion.

Step S18: Store the data of the analog-digital conversion result into the analog-digital conversion result register 22 and execute the Step S19.

Step S19: Compare the value stored in the analog-digital conversion result register 22 to the value stored in the rotation-blocked current setting register 24 through a comparing procedure 23: if the value stored in the analog-digital conversion result register 22 is smaller than the value stored in the rotation-blocked current setting register 24, executing the Step S20; if the value stored in the analog-digital conversion result register 22 is greater than the value stored in the rotation-blocked current setting register 24, executing the Step S21.

Step S20: Execute the Step S22 after setting the register R21=0.

Step S21: Execute the Step S22 after setting the register R21=1.

Step S22: Return to the main program.

There is a rotation-blocked current test subprogram set in the microcomputer control unit 2. When the electronic garbage can is executing a lid opening-closing procedure, the rotation-blocked current test subprogram will be called every 25 ms. Even the lid has opened or closed to its designated position, the rotation-blocked time of the motor 5 will not exceed for about 25 ms, which significantly reduces the rotation-blocked time of the motor 5 (the rotation-blocked time of the motor 5 for conventional technology is 500 ms). Therefore, according to the electronic garbage can of the present invention, when its battery has relatively sufficient power, approximately 3.5 times less power is consumed for movement than the prior art.

The principle of the operation of the power-saving control device for operation of electronic garbage can according to the above preferred embodiment of the present invention is described as follows.

When the input port P6 of the microcomputer control chip received an opening triggering signal, the program executes the Step S02. In the Step S02, the ports P1 and P4 the microcomputer control chip is in low level, the ports P2 and P3 is in high level, the triodes Q1 and Q3 of the motor positive and negative rotation driving circuit 3 are electrically connected, and the Q2 and Q4 are disconnected, so that the motor 5 receives a positive voltage and starts to positively rotate. Then, the program sequentially executes the Step S03 to set a data register R20=40 in the microcomputer control unit 2, executes the Step S04 to delay 25 ms, and executes the Step S05 to call the rotation-blocked current test subprogram. In the rotation-blocked current test subprogram, the value stored in the analog-digital conversion result register 22 is compared to the value stored in the rotation-blocked current setting register 24 through a comparing procedure 23. If the value stored in the analog-digital conversion result register 22 is smaller than the value stored in the rotation-blocked current setting register 24, a data register R21 in the microcomputer control unit 2 is set to be zero, wherein if the value stored in the analog-digital conversion result register 22 is greater than the value stored in the rotation-blocked current setting register 24, the R21 is set to be 1. Then, it will return to the main program to execute the Step S06 to determine if R21 is 0. If not, it indicates that the motor is in the rotation-blocked condition (i.e. the lid has opened to the designated position), so that the program enters the Step S08 to stop supplying power for the motor. On the other hand, if R21 is 0, it indicates that the motor is not in the rotation-blocked condition (i.e. the lid has not opened to the designated position), so that the program executes the Step S07 to subtract 1 from the value of the register R20 and determine if the value of the register R20 is zero again. If the value is not zero, it indicates that the predetermined 1 second action time has not been up yet, so that the program returns to the Step S04. If the value is zero, it indicates that the predetermined 1 second action time is up, so that the program executes the Step S08 to set the output ports of the microcomputer control chip P1 and P2 into high level, P3 and P4 into low level, while all the triodes Q1, Q2, Q3, and Q4 are disconnected, so that the motor 5 loses its power and stops. Then, the program executes the Step S09 to have the lid remained open for 3 seconds. Based on the above Step S02-S08, it may be implemented that when the motor 5 is in the rotation-blocked condition, it stops supplying power to the motor 5 in about 25 ms; when the motor 5 is not in the rotation-blocked condition, it also stops supplying power to the motor 5 after 1 second.

It is worth mentioning that any unspecified detail of the present invention is embodied as the prior art.

What is claimed is:

1. A power-saving control device for operation of electronic garbage can, comprising:
a microcomputer control unit,
a motor positive and negative rotation driving circuit,
an opening signal triggering circuit which is electrically connected with a controlling port of said motor positive and negative rotation driving circuit through said microcomputer control unit,
a DC power supply,
a rotation-blocked current setting register,
a sampling resistor,
an analog-digital converter,
an analog-digital conversion result register, and
a comparing unit which is sequentially connected, wherein a reference port of said comparing unit is electrically connected with said rotation-blocked current setting register, wherein an output port of said comparing unit is electrically connected with said microcomputer control unit, wherein an end of said sampling resistor is electrically connected with said motor positive and negative rotation driving circuit, while another end of said sampling resistor is electrically connected with said DC power supply, wherein a junction between said sampling resistor and said motor positive and negative rotation driving circuit is a sampling output port, wherein said sampling output port outputs a real-time current analog value, wherein said sampling output port is electrically connected with said analog-digital converter so as to enable said analog-digital converter converting the real-time current analog value into a real-time current digital value to be stored into said analog-digital conversion result register, wherein said rotation-blocked current setting register stores a predetermined reference current value, which is smaller than an actual rotation-blocked current value of said motor, wherein said comparing unit compares the real-time current value stored in said analog-digital conversion result register to the predetermined reference current value stored in said rotation-blocked current setting register, wherein when the real-time current value is greater than the predetermined reference current value, said comparing unit outputs a triggering command to said microcomputer control unit, rendering said microcomputer control unit controlling said motor positive and negative rotation driving circuit to stop supplying power to said motor.

2. The power-saving control device, as recited in claim 1, wherein said analog-digital converter, said analog-digital conversion result register, said rotation-blocked current setting register, said comparing unit, and said microcomputer control unit are integrated in a chip.

3. The power-saving control device, as recited in claim 2, further comprising a RC filter, wherein said sampling output port is electrically connected with said analog-digital converter through said RC filter.

4. The power-saving control device, as recited in claim 2, wherein when said motor positive and negative rotation driving circuit is operating, said microcomputer control unit controls said comparing unit to compare the real-time current value with the predetermined reference current value once in a predetermined period of time.

5. The power-saving control device, as recited in claim 1, further comprising a RC filter, wherein said sampling output port is electrically connected with said analog-digital converter through said RC filter.

6. The power-saving control device, as recited in claim 5, wherein when said motor positive and negative rotation driving circuit is operating, said microcomputer control unit controls said comparing unit to compare the real-time current value with the predetermined reference current value once in a predetermined period of time.

7. The power-saving control device, as recited in claim 1, wherein when said motor positive and negative rotation driving circuit is operating, said microcomputer control unit controls said comparing unit to compare the real-time current value with the predetermined reference current value once in a predetermined period of time.

8. The power-saving control device, as recited in claim 7, wherein when said motor positive and negative rotation driving circuit is operating, said microcomputer control unit controls said comparing unit to compare the real-time current value with the predetermined reference current value once in a predetermined period of time.

9. A method for operating an electronic garbage which comprises a microcomputer control chip controlling a motor to open and close a lid of said garbage can, wherein said microcomputer control chip comprises a register R20, a register R21, an analog-digital converter, and an analog-digital conversion result register connected therewith, wherein the method comprises the following steps:
(S01) determining if said microcomputer control chip has received an opening triggering signal, wherein
if no opening triggering signal is received, execute the step (S01);
if said opening triggering signal is received; execute a step (S02);
(S02) positively powering said motor to start opening said lid, and executing a step (S03);
(S03) setting said register R20=40 and executing a step (S04);
(S04) delaying 25 ms and then executing a step (S05);
(S05) calling a rotation-blocked current test subprogram and executing a step (S06) after returning;
(S06) determining if a value R21 of said register R21 is zero, wherein
if said value R21=0, execute a step (S07);
if said value R21≠0, execute a step (S08);
(S07) determining if a value R20 of said register R20 minus 1 equals to zero, wherein
if said value R20 is not zero, return to execute the step (S04);
if said value R20 is zero, execute a step (S08);
(S08) stopping to supply power for the motor to stop the motor, remaining the lid in the opening condition, and executing a step (S09);
(S09) delaying 3 seconds and executing a step (S10) afterwards;
(S10) negatively powering the motor, and executing a step (S11) after the lid has been closed;
(S11) executing a step (S12) after setting said register R20=40;
(S12) delaying 25 ms and executing a step (S13);
(S13) calling said rotation-blocked current test subprogram and executing a step (S14) after returning;
(S14) determining if said value R21 of said register R21 is zero, wherein
if said value R21=0, execute a step (S15);
if said value R21≠0, execute a step (S16);
(S15) determining if said value R20 of said register R20 minus 1 equals to zero, wherein
if said value R20 is not zero, return to execute the step (S12);
if said value R20 is zero, execute a step (S16); and
(S16) stopping the motor from rotating, remaining the lid in the close condition, and returning to execute the step (S01) for the next use of the garbage can.

10. The method, as recited in claim 9, wherein said rotation-blocked current test subprogram comprising the following steps:
(S17) sending a start signal by said microcomputer control unit to said analog-digital converter, so that said analog-digital converter conducts an analog-digital conversion, and then executing a step (S18) after said analog-digital conversion;
(S18) storing data of an analog-digital conversion result into said analog-digital conversion result register and executing a step (S19);
(S19) comparing a value stored in said analog-digital conversion result register to a value stored in a rotation-blocked current setting register through a comparing procedure, wherein
if said value stored in the analog-digital conversion result register is smaller than said value stored in the rotation-blocked current setting register, execute a step (S20),
if said value stored in the analog-digital conversion result register is greater than said value stored in the rotation-blocked current setting register, execute a step (S21);
(S20) executing a step (S22) after setting said register R21=0;
(S21) executing a step (S22) after setting said register R21=1; and
(S22) returning to a main program.

* * * * *